(12) United States Patent
Saito et al.

(10) Patent No.: US 6,507,479 B2
(45) Date of Patent: Jan. 14, 2003

(54) ELECTRIC DOUBLE-LAYER CAPACITOR HAVING A LAMINATED OVERCOAT

(75) Inventors: Takashi Saito, Tokyo (JP); Ryuichi Kasahara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/774,087

(22) Filed: Jan. 31, 2001

(65) Prior Publication Data

US 2001/0053059 A1 Dec. 20, 2001

(30) Foreign Application Priority Data

Feb. 1, 2000 (JP) .................................. 2000-024509

(51) Int. Cl.$^7$ ................................................ H01G 9/00
(52) U.S. Cl. .................. 361/502; 361/503; 361/508; 361/512; 361/523; 429/233
(58) Field of Search ................ 361/502, 503, 361/508, 512, 504, 511, 523, 528, 521, 532, 517, 525; 429/233

(56) References Cited

U.S. PATENT DOCUMENTS

| | | | | |
|---|---|---|---|---|
| 5,136,472 A | * | 8/1992 | Tsuchiya et al. | 361/502 |
| 5,227,960 A | * | 7/1993 | Kunishi et al. | 361/502 |
| 5,377,073 A | * | 12/1994 | Fukaumi et al. | 361/540 |
| 5,550,706 A | * | 8/1996 | Kurzweil et al. | 361/502 |
| 5,859,761 A | * | 1/1999 | Aoki et al. | 361/502 |
| 5,907,472 A | * | 5/1999 | Farahmandi et al. | 361/502 |
| 6,094,338 A | * | 7/2000 | Hirahara et al. | 361/502 |

FOREIGN PATENT DOCUMENTS

| | | |
|---|---|---|
| JP | 56-49513 | 5/1981 |
| JP | 57-60828 | 4/1982 |
| JP | 59-51512 | 3/1984 |
| JP | 60-213016 | 10/1985 |
| JP | 60-216527 | 10/1985 |
| JP | 2-94619 | 4/1990 |
| JP | 6-5467 | 1/1994 |
| JP | 7-70448 | 7/1995 |
| JP | 7-91449 | 10/1995 |

* cited by examiner

Primary Examiner—Dean A. Reichard
Assistant Examiner—Nguyen Ha
(74) Attorney, Agent, or Firm—Sughrue Mion, PLLC

(57) ABSTRACT

An electric double-layer capacitor (EDLC) has a laminated overcoat encapsulating a stacked body including a plurality of basic cells and a pair of terminals sandwiching therebetween the stacked body. The innermost film of the laminated overcoat is thermally fused onto the exposed surfaces of the terminal plates and the stacked body substantially without a gap. The fusing step is conducted by an equal-pressure pressing using a hot water while the internal of the laminated overcoat is evacuated.

16 Claims, 3 Drawing Sheets

FIG. 5

| | | SAMPLE #1 | SAMPLE #2 | SAMPLE #3 | SAMPLE #4 | COMP.EX #1 | COMP.EX |
|---|---|---|---|---|---|---|---|
| AFTER FABRICATION | APPEARANCE | G | G | G | G | G | G |
| | ESR (Ω) | 0.015 | 0.018 | — | 0.013 | 0.013 | 0.020 |
| | CAPACITANCE (F) | 35 | 34 | — | 35 | 35 | 35 |
| AFTER 1000 hrs (AT 70°C) | APPEARANCE | G | G | — | G | G | BLISTER |
| | ESR (Ω) | 0.018 | 0.022 | — | 0.016 | 0.16 | 100Ω |
| | CAPACITANCE (F) | 40 | 41 | — | 39 | 41 | — |

6,507,479 B2

ELECTRIC DOUBLE-LAYER CAPACITOR HAVING A LAMINATED OVERCOAT

BACKGROUND OF THE INVENTION (a) Field of the Invention

The present invention relates to an electric double-layer capacitor (EDLC) having a laminated overcoat and, more particularly to such an EDLC having excellent electric characteristics and a longer lifetime.

(b) Description of the Related Art

The EDLC uses an electric double layer structure generated at the interfaces between polarized electrodes and an electrolytic solution for storing electric charge therein. The EDLC has the advantages of a lower thickness of the double-layer structure as low as several nanometers and capability of having a larger capacitance by using the polarized electrodes made of a material having a larger surface area, such as activated carbon.

EDLCs described in Patent Publications JP-2054380 and JP-A-57-60828 have polarized electrodes made of aluminum foils for achieving a larger capacitance and a lower internal resistance. These EDLCs are now being used for a variety of applications requiring a large electric power, such as for a hybrid car or electric car which enables an energy recovery due to an engine acting as a motor, a photovoltaic power generation or wind power generation for alleviation of fluctuation of generated power, a backup source to be used for a short-time power failure, a rash current source during startup of a motor, and alleviation of fluctuation of load of a fuel cell. The EDLC is generally requested to have a lower internal resistance and smaller dimensions for achieving discharge of large electric power in several seconds, for example.

The EDLCs are categorized into two types: one having an aqueous electrolytic solution such as including sulfuric acid and potassium hydroxide; and the other having an organic electrolytic solution using an organic solvent such as propylene carbonate and an electrolytic solution such as quaternary ammonium chloride. The EDLCs have different electric characteristics, constituent elements and structures depending on the types of the electric solution used therein.

The withstand voltage, for example, of the EDLC is limited by the electrolysis capability of the electrolytic solution used therein and assumes about one volt in the case of the aqueous electrolytic solution and about 2.3 to 3.3 volts in the case of organic electrolytic solution. More specifically, the EDLC using the organic electrolytic solution stores larger energy or can be made to have smaller dimensions.

On the other hand, the organic electrolytic solution has a specific resistance of about 100 Ω-cm, whereas the aqueous electrolytic solution has a specific resistance of about 1 Ω-cm. This means that the EDLC having the aqueous electrolytic solution has a desirable lower internal resistance due to the lower specific resistance of the electrolytic solution.

As for electrodes, a less expensive metal, such as aluminum, can be used in the EDLC having the organic electrolytic solution, whereas such a less expensive metal cannot be used in the EDLC having the aqueous electrolytic solution.

In view of the above facts, the EDLC having the organic electrolytic solution generally has either a wound structure wherein an aluminum foil is wound around the polarized electrodes or a coin cell structure using stainless steel. On the other hand, the EDLC having the aqueous electrolytic solution has a stacked structure including layers made of rubber or plastics.

Referring to FIG. 1, a conventional EDLC having the aqueous electrolytic solution has a plurality of basic cells 16 each including a separator 14, a pair of polarized electrodes 12 sandwiching therebetween the separator 14, and a pair of current collectors 13 sandwiching therebetween the pair of polarized electrodes 12, and a gasket disposed between the pair of current collectors 13 for encircling the separator 14 and the pair of polarized electrodes 12. The plurality of basic cells 16 are stacked one on another to form a stacked body 17, with each of current collectors 13 sandwiched between adjacent basic cells being shared by the adjacent basic cells. Each separator 14 is impregnated with an aqueous electrolytic solution.

The stacked body 17 is sandwiched between a pair of terminal plates 18, which are coupled together by bolts 19 and nuts 21. An insulator bush 19 electrically isolates the bolt 19 from a corresponding nut 21.

Each of the polarized electrodes 12 has a large surface area and a suitable electric conductivity, is made of material having an electrically-chemically stable property, and is impregnated with the aqueous electrolytic solution.

In general, the polarized electrode 12 is made of a material selected from the group consisting of activated carbon powder or activated carbon fibers having a specific surface area ranging between about 500m$^2$/g and about 250m$^2$/g, such activated carbon powder or fibers bonded by a fluorine-based binder, solid activated carbon which is bound by carbon as disclosed in Patent Publication JP-B-7-70448, and activated carbon/polyacene wherein activated carbon powder and/or activated carbon fibers are bonded by polyacene.

The current collector 13 electrically connects the polarized electrode 12 to an external circuit, prevents leakage of electrolytic solution, and is made of butyl rubber or elastomer added with carbon for achieving a suitable electric conductivity. In general, the current collector 13 has a thickness below about 500 μm and a specific resistance below about 10 Ω-cm.

The separator 14 prevents a short-circuit failure between the pair of polarized electrodes 12, allows electrolytic ions to pass therethrough and is made of unwoven cloth or porous film impregnated with the electrolytic solution. If the separator 14 is made of plastics such as polypropylene or polyethylene, the separator is added with a surfactant or silica for hydrophilic property.

The gasket 15 prevents a short-circuit failure between the pair of current collectors 12 and leakage of electrolytic solution, and is used as a structural material, which may be plastics, butyl rubber or elastomer.

If the gasket 15 is made of plastics, the gasket is bonded onto the current collector 12 by epoxy resin etc. If the gasket 15 is made of rubber or elastomer, the gasket 15 may be bonded onto the current collector 12 by vulcanization at a temperature of 100 to 130° C., as described in JP-A-60-216527.

The withstand voltage of the EDLC is restricted by the electrolysis of the electrolytic solution, as described above. Thus, if the EDLC is to be used at a higher working voltage, a plurality of basic cells 16 are connected in series.

Known structures for the EDLC include a simply-stacked structure wherein the basic cells 16 are simply stacked one on another and a bipolar structure, such as described in JP-A-6-005467 and described above with reference to FIG. 1. The bipolar structure is obtained by modification of the simply-stacked structure wherein each current collector to be sandwiched between adjacent basic cells 16 in the simply-stacked structure is designed to be shared by the adjacent basic cells.

The basic cells 16 in the bipolar structure are subjected to an external pressure for reduction of the contact resistance by using rivets or bolts. In this case, especially in the case of using bolts, the EDLC has the drawback of a larger thickness.

For reduction of the thickness of the EDLC shown in FIG. 1, a laminated structure is recently used for the packing structure of the EDLC. Referring to FIG. 2, the EDLC having the laminated structure includes a stacked body (EDLC body) 17, a pair of terminal plates 18 sandwiching therebetween the stacked body 17 to form a basic cell or a stack of basic cells, and a laminated overcoat 11 encapsulating the stacked body 17. The laminated overcoat 11 is formed by folding a laminated film structure, and includes an innermost fused layer 11c having a fused edges, an intermediate foil 11b made of aluminum or aluminum alloy, and an outermost resin layer 11a. In the laminated structure, a gap 22 is formed at each side of the stacked body 17 and the terminal plates 18. The gap 22 generally has larger dimensions in the vicinity of the external terminals 18a.

The EDLC of FIG. 2 is fabricated by the steps of encapsulating the basic cell or basic cells forming the stacked body 17 sandwiched between the terminal plates 18 by using a folded rectangular laminated overcoat 11, and fusing the innermost layers 11c together at three edges of the basic cell while evacuating the internal of the laminated overcoat 11 to a vacuum. The internal space remaining in the laminated overcoat 11 during the evacuation forms an air gap 22 after the fabrication. The evacuation of the internal space allows the laminated overcoat 11 to exert a pressure to the basic cell after the fabrication, thereby achieving a stable electric property of the EDLC.

In a secondary battery wherein the liquid is directly encapsulated, it is sufficient to maintain the sealing function of the overcoat to the extent that prevents the liquid leakage for several years, for example, before it is replaced by another secondary battery. However, in the EDLC, the stacked structure is subjected to an external force by the atmospheric pressure for stabilizing the electric property. Thus, ingress of air to the gap inside the laminated overcoat is serious and thus should be avoided in the EDLC, thereby necessitating the laminated overcoat 11 to have a higher sealing function.

The structure of the laminated overcoat as described above is superior in a liquid sealing property and can be made as a thin film. Thus, this type of laminated overcoat is used in a variety of electrochemical components including an aluminum electrolytic capacitor, such as described in JP-A-56-049513, -59-051512 and -60-213016, and the EDLC such as described in JP-A-02-094619.

The structure of the laminated overcoat can be fabricated by a simple fabrication process with a low cost. In addition, the laminated overcoat has the advantage for the structure of the EDLC that the step of sealing the basic cell is conducted with a reduced internal pressure while subjecting the laminated structure to the atmospheric pressure thereby reducing the contact resistance between the constituent elements.

The laminated overcoat has, in a practical structure, an aluminum or aluminum alloy foil having a thickness of 10 to 100 $\mu$m, a pair of resin films each having a thickness of several tens of micrometers and bonded onto either surface of the foil, and a fused layer formed as an innermost layer of the laminated structure. The fused layer is in general made of polyolefine resin such as polyethylene resin, ethylene copolymer resin or polypropylene resin.

In the laminated overcoat, ionomer resin, which is one of the species of polypropylene and ethylene copolymer, is suitably used due to the excellent heat sealing property thereof or the excellent adhesive property with a metal. The laminated overcoat used in the electrochemical components generally has a three-layer structure, and may have a four-layer structure for better prevention of a short-circuit failure.

As described above, the EDLC having the laminated structure has the advantages of smaller dimensions and lower weight due to the packaging structure using the laminated overcoat.

In the conventional EDLC having the laminated structure, however, there is a problem of ingress of air, which damages the electric property of the EDLC obtained by the laminated structure. It is difficult to secure the sealing property of the fused innermost surface of the laminated overcoat for prevention of the ingress of air, especially in the vicinity of the external terminals. This degrades the reliability of the EDLC having the laminated structure to result in reduction of the long-term stability of the electric property.

SUMMARY OF THE INVENTION

It is therefore an object of the present invention to provide a EDLC having the laminated structure which is capable of effectively securing the long-term stability of the electric property of the EDLC by improving the sealing property of the laminated structure.

The present invention provides an EDLC including: a stacked body including at least one basic cell having a separator, a pair of polarized electrodes sandwiching therebetween the separator, a pair of current collectors sandwiching therebetween the pair of polarized electrodes, the separator and the polarized electrodes being impregnated with an electrolytic solution; a pair of terminal plates for sandwiching therebetween the stacked body, the terminal plates being electrically connected to the current collectors disposed on outermost sides of the stacked body; a pair of external terminals extending from the terminal plates; and a laminated overcoat for encapsulating the stacked body and the terminal plates, the laminated overcoat having an innermost film adhered to substantially entire exposed surfaces of the terminal plates and the stacked body.

In accordance with the EDLC of the present invention, an EDLC having a longer lifetime and excellent electric characteristics can be obtained due to the close contact of the fused innermost layer of the laminated overcoat with respect to the stacked body and the terminal plate substantially without a gap therebetween. The structure of the close contact can be obtained by an equal-pressure pressing of the overall structure by using an equal-pressure pressing machine while evacuating the internal of the overcoat.

The above and other objects, features and advantages of the present invention will be more apparent from the following description, referring to the accompanying drawings.

BRIEF DESCRIPTION OF THE DRAWINGS

FIG. 5 is a table showing the results of evaluation test for samples of the embodiments and a comparative example.

PREFERRED EMBODIMENTS OF THE INVENTION

Figure 1:
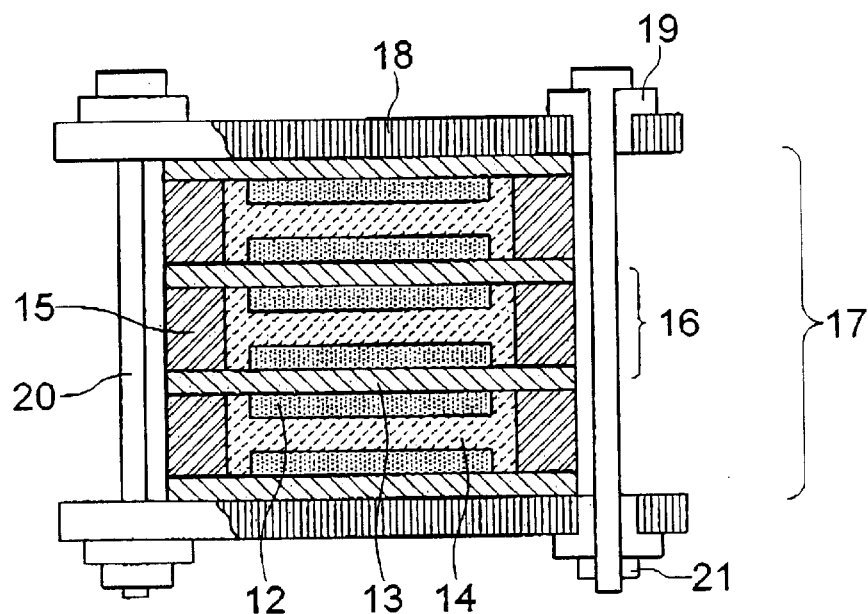
FIG. 1 is a sectional view of a conventional EDLC having a stacked structure.

Now, the present invention is more specifically described with reference to accompanying drawings, wherein similar constituent elements are designated by similar reference numerals throughout the drawings.

Figure 3:
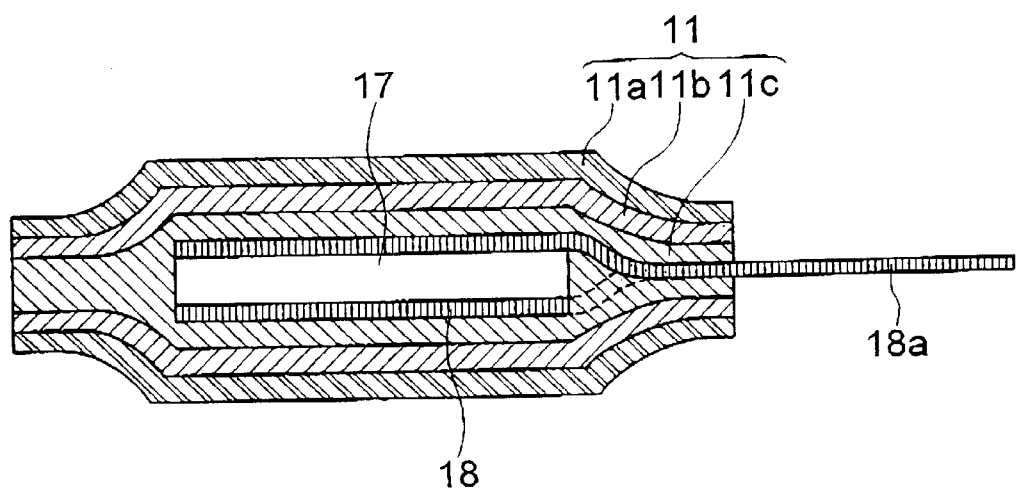
FIG. 3 is a sectional view of an EDLC according to a first embodiment of the present invention.

Referring to FIG. 3, an EDLC according to a first embodiment of the present invention has a laminated structure and includes a stacked body (EDLC body) 17, a pair of terminal plates 18 sandwiching therebetween the staked body 17, and a laminated overcoat 11 having an innermost surface fused onto the stacked body 17 and the terminal plates 18 substantially without forming a gap. The laminated overcoat 11 is formed by fusing a pair of laminated films at a high temperature using an equal-pressure pressing machine while evacuating the internal of the laminated overcoat 11.

The stacked body 17 includes one or more of basic cells each including a separator, a pair of polarized electrodes sandwiching therebetween the separator, a pair of current collectors sandwiching therebetween the pair of polarized electrodes, a gasket disposed between the pair of current collectors for encircling the separator and the pair of polarized electrodes, and an electrolytic solution used for impregnating the separator and the polarized electrodes therewith. The basic cells are stacked one on another in number corresponding to the designed withstand voltage.

The pair of terminal plates 18 are disposed so as to sandwich therebetween the stacked body 17. A pair of external terminals 18a extend from the respective terminal plates 18 in the transverse direction. The external terminal 18a, however, is not limited to the structure shown in the figure, and may have any configuration.

The laminated overcoat 11 has a laminated structure including an innermost fused layer 11c, an intermediate aluminum or aluminum alloy foil 11b and an outermost resin layer 11a. The fused layer 11c encapsulates therein and fused to the stacked body 17 and the terminal plates 18.

It is preferable that the fused layer 11c be in close contact with the terminal plates 18 except for the external terminals 18a and the stacked body 17 substantially without forming therebetween a gap, whereby the terminal plates 18 except for the external terminals 18a and the stacked body 17 are sealed within the laminated overcoat 11 without being in contact with the air.

Even if a gap remains within the laminated overcoat 11 due to a current fabrication technique using the equal-pressure pressing, the gap should be small enough to assure that the air does not enter the electrolytic solution.

In this text, the term "close contact" between the laminated overcoat 11 and the terminal plates 18 or the stacked body 17, or the term "close contact substantially without a gap" means that the gap is removed by the fabrication process of the EDLC to such an extent that prohibits the ingress of air into the electrolytic solution. Thus, the "close contact" substantially without a gap is achieved in the present invention when there is no gap having an inner volume above 0.125 mm$^3$, because atmospheric air does not enter the electrolytic solution in such a case.

The fused layer 11c is preferably made of at least one material selected from the group consisting of polyethylene resin, ethylene copolymer resin and polypropylene resin. The fused layer 11c made of such a material has an improved adhesive property and effectively suppress the ingress of air.

In the structure as described above, the EDLC has an improved reliability of the electric property thereof.

Figure 4:
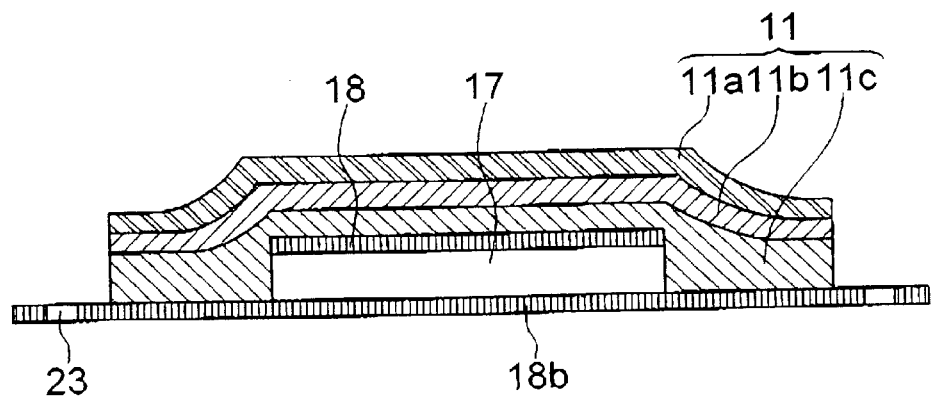
FIG. 4 is a sectional view of an EDLC according to a second embodiment of the present invention.

Referring to FIG. 4, an EDLC according to a second embodiment of the present invention includes a rectangular substrate 18b having a rigid or elastic property and holes therein at the four corners, a stacked body 17 disposed on the substrate 18b with a marginal area left at four sides of the stacked body 17, a terminal plate 18 formed on top of the stacked body 17, a laminated overcoat 11 covering the terminal plate 18, the stacked body and the marginal area of the substrate 18b except for the edge of the substrate 18b.

The laminated overcoat 11 has a three-layer structure as in the case of the first embodiment. The fused layer 11c is fused to the top and sides of the terminal plate 18, the sides of the stacked body 17 and the top surface of the marginal area of the substrate 18b substantially without forming a gap between the same and these encapsulated elements.

The substrate 18b formed as a part of the encapsulating member and having a rigidity or flexibility exerts a suitable mechanical strength against the external force or impact for protecting the EDLC.

The substrate 18b may have, instead of the rectangular shape, a cylindrical shape mounting thereon the stacked body 17, terminal plate 18 and the laminated overcoat 11 at the internal surface thereof, for example. The substrate 18b may be an electric component on which the EDLC is to be mounted, for reduction of the number of components and the space for the appliances.

The substrate 18b preferably has mount holes at which the EDLC is fixed onto a support member. The use of such a substrate 18b in the second embodiment is advantageous over the first embodiment in that the EDLC is firmly fixed at the desired location with accuracy.

The substrate 18b may have electric wires or electric terminals formed thereon. For example, if the substrate 18b is provided with electric terminals, the EDLC can be fixed directly onto the substrate 18b by soldering. This reduces the dimensions of the components, improves the fabrication process and allows wider design choice. The substrate 18b may be a wiring circuit board on which other electric components are mounted, for further reduction of the number of components.

The substrate 18b may mount thereon a plurality of basic cells separately or a stacked structure including a plurality of basic cells. The plurality of basic cells may have different specifications or properties. The plurality of basic cells may be mounted on both sides of the substrate 18.

A top thrust member or support member may be disposed on the laminated overcoat 11 for thrusting the stacked body 17 between the top thrust member or the support member and the substrate 18b having an elastic property. The elastic property of the substrate 18b assures the reliability of electric contact of the basic cells, thereby improving electric characteristics of the EDLC.

The configurations of the EDLC of the second embodiment other than those described herein are similar to the configurations described in connection with the first embodiment.

The fabrication process for the EDLC of the present invention will be described below.

The fusion of the fused layer 11c of the laminated overcoat 11 to the surfaces of the stacked body 17 and the terminal plates 18 is conducted by using an equal-pressure pressing machine using a fluid having a temperature higher than the softening temperature of the fused layer 11c.

The equal-pressure pressing machine may be a such a machine as using a hydrostatic pressure. The stacked body 17 and the pair of terminal plates 18 encapsulated by the laminated overcoat 11 is kept in a vacuum resin bag having a two-layer structure including a nylon film and a polyethylene film, which is evacuated for vacuum packing. The vacuum resin bag accommodating therein these members is subjected to hydrostatic pressure of about 9.8 MPa (about 100 kg/cm$^2$) in the pressing machine maintained at a temperature of 90° C., thereby fusing the fused layer 11c to the stacked body 17 and the terminal plates 18, whereby the EDLC of the first embodiment is obtained.

The temperature condition may be such that the fused layer 11c is completely melted at the temperature or such that the fused layer 11 is softened and pressed for fusion at the temperature without complete melting.

In the former temperature condition, the profile of the temperature and the pressure can be set without difficulty. However, it may be necessary to use a spacer that prevents a short-circuit failure between the external terminal and the aluminum or aluminum foil. On the other hand, in the latter temperature condition, such a short-circuit failure does not occur.

Before the step of equal-pressure pressing, it is preferable that the separator, polarized electrodes, current collector, gasket and electrolytic solution are shaped to form a bulk-like body for improving handling capability of the basic cell in the equal-pressure pressing step.

It is preferable that the internal of the vacuum resin bag accommodating the bulk-like body is evacuated to a vacuum before the equal-pressure pressing. The vacuum as used herein means a pressure below about 1333 Pa. This allows an equal pressure to be applied to the bulk-like body having a complicated shape, and suppresses generation of the gap between the laminated overcoat and the stacked body and the terminal plates, thereby effectively preventing air from entering the electrolytic solution.

The fused layer 11c may be made of at least one material selected from the group consisting of polyethylene resin, ethylene copolymer resin and polypropylene resin. The fused layer 11c preferably has a thickness of 100 $\mu$m or more before adhering to the stacked structure 17 and the terminal plates 18. This thickness of the fused layer 11c assists improvement of the electric characteristics of the EDLC.

Samples of the EDLC of the present invention as well as comparative examples were fabricated for evaluation of the properties thereof. FIG. 5 shows the results of the evaluations. The details of the samples and the comparative examples will be described below.

Sample #1

Sample #1 was formed according to the first embodiment and had polarized electrodes made of a composite material including activated carbon and polyacene, had dimensions of about 68×48×0.5 mm, and had a specific surface area of about 1200 m$^2$/g. Sample #1 was immersed in about 40-weight-percent (wt. %) sulfuric acid, and the vessel of the sulfuric acid was evacuated for impregnation with the sulfuric acid by a lower pressure.

The current collector had planar dimensions of about 84×64 mm and a thickness of about 100 $\mu$m, was made of unvulcanized, conductive butyl rubber having a specific resistance of 0.2 Ω-cm in a surface direction.

The separator had planar dimensions of about 70×50 mm and a thickness of 50 $\mu$m, and was made of unwoven cloth having a METSUKE of about 16 g/m$^2$.

The gasket had outer dimensions of about 84×64 mm, inner dimensions of about 70×50 mm and a thickness of about 1.0 mm, is made of unvulcanized butyl rubber.

The separator was sandwiched between the pair of polarized electrodes to form a fundamental structure of the basic cell, and a plurality (three) of the fundamental structures were stacked one on another so that a single collector was shared by adjacent basic cells. The stacked basic cells were heated at a temperature of about 120° C. for vulcanizing and bonding the current collector and the gasket to form a stacked body having three basic cells.

The terminal plates 18 formed by plating aluminum plates with tin are disposed for sandwiching therebetween the stacked body 17, while adhered thereto with silver paste.

The laminated overcoat 11 had a structure wherein a 40-$\mu$m-thick aluminum alloy foil 11b was sandwiched between a 25-$\mu$m-thick nylon film 11a and a 100-$\mu$m-thick fused film made of ionomer.

A pair of laminated overcoats 11, each having planar dimensions of about 104×84 mm, were disposed for sandwiching the stacked body 17, with the fused layers 11c being in contact with the respective terminal plates 18.

The stacked body 17 and the terminal plates 18 sandwiched between the pair of laminated overcoats 11 were then received in a vacuum resin bag. The resin bag was evacuated and then pressed by using a hydrostatic pressure of about 9.8 MPa (100 kg/cm2) at a temperature of about 90° C. Thus, sample #1 was obtained.

Sample #2

The structure and fabrication process of sample #2 of the EDLC were similar to those of sample #1 except for the thickness of the fused layer 11c, which was obtained by additionally adhering another ionomer film having a thickness of 70 $\mu$m to the fused layer of sample #1 to obtain a total thickness of 170 $\mu$m. Sample #3

The structure and fabrication process of sample #3 of the EDLC were similar to those of sample #1 except for the thickness of the fused layer 11c, which was about 30 $\mu$m in sample #3.

Sample #4

The structure and fabrication process of sample #4 were similar to those in sample #1 except for the electrolytic solution, which was an organic electrolytic solution including propylene carbonate and 1 mol. of tetraethylammonium fluoride in sample #4, and the structure of the stacked body which included a single basic cell in sample #4.

Sample #5

Sample #5 had a structure similar to that of the second embodiment shown in FIG. 4 except for a pair of stacked bodies provided therein. More specifically, sample #5 included an aluminum substrate 18b plated with tin and having thickness of 2 mm, the pair of stacked bodies 17 disposed on both surfaces of the aluminum substrate 18b, a pair of aluminum terminal plates 18 plated with tin and having a thickness of 100 $\mu$m, and a pair of laminated overcoats 11 each covering the stacked body 17 and the terminal plate 18 and fused thereto and to the aluminum substrate 18b. The aluminum substrate 18b mounted thereon external terminals. The stacked bodies were adhered onto the aluminum substrate 18b by silver paste.

The aluminum substrate 18b is about 130×84 mm wide, had four holes 23, which were 3 mm long in diameter, at respective corners for fixing. Each of the laminated overcoats 11 was about 104×84 mm wide.

Figure 2:
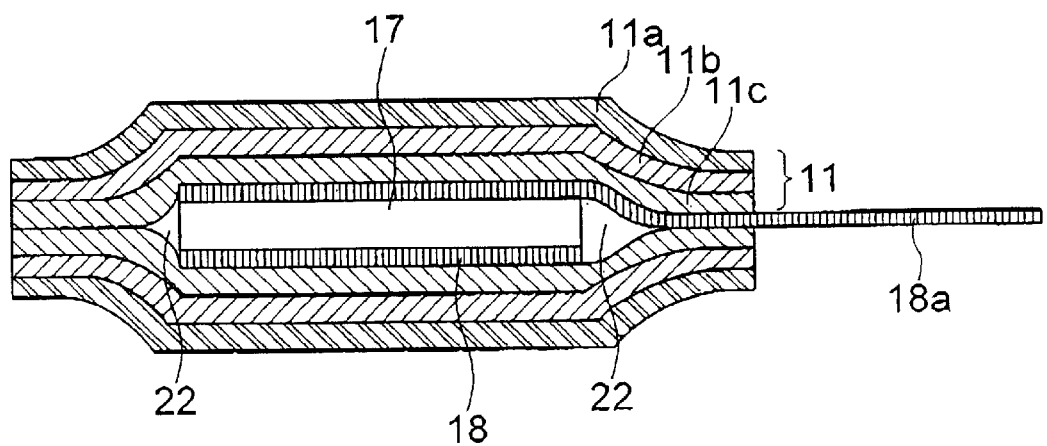
FIG. 2 is sectional view of another conventional EDLC having a laminated structure.

Comparative example shown in FIG. 2 was also fabricated. The laminated overcoat 11 was about 208×84 mm wide, and folded at the central line thereof with the fused layer 11c being inside, whereby the final area of the laminated overcoat 11 was 104×84 mm wide. The laminated overcoat 11 was fused at both the sides thereof, which were 104 mm long, by fusing the fused layers 11c with a fused width being about 5 mm. Thus, the laminated overcoat 11 is shaped to form a bag or envelope.

The stacked body 17 adhered to the terminal plates 18 with silver paste is then received in the bag, which was evacuated. The opposing fused layers 11c within the bag of the laminated overcoat 11 were then thermally fused together and to the terminal plates 18 at the reduced pressure. In this case, the fused width was 5 mm.

Referring to FIG. 5, there are shown the results of the measurements and evaluation in connection with the above samples and comparative example.

The evaluation test of those EDLCs was conducted immediately after the fabrication as well as after about 1000 hours (42 days) of aging condition at a temperature of about 70° C. in an oven since the fabrication. The items of each evaluation test included the appearance, the equivalent serial resistance (ESR) and the capacitance of the EDLCs.

The ESR is measured by measuring the magnitude of the current and the phase of the current with respect to the AC voltage applied to the EDLC under test, without biasing a DC voltage, the applied AC voltage having a frequency of 1 kHz and 10 millivolts.

The capacitance of the EDLC was measured by a constant current discharge method. More specifically, the EDLC under test is first charged by an applied voltage of about 2.5 volts for 30 minutes. Then, the EDLC is subjected to a constant current discharge while being measured for the terminal voltage thereof. The time length $\Delta t$ is measured from the time instant at which the terminal voltage assumes 60% (or 1.5 volts) of the applied voltage to the time instant at which the terminal voltage assumes 50% (or 1.25 volts) of the applied voltage. The capacitance (C) is obtained in terms of the constant current (I), time length $\Delta t$ and difference ($\Delta V$) of the terminal voltage as follows:

$$C = I \times \Delta t / \Delta V.$$

As shown in FIG. 5, the appearances of samples #1, #2, #4 and #5 did not change after 1000 hours of the aging condition, whereas the comparative example exhibited blister after the aging condition.

The ESRs of samples #1 and #2 slightly increased. This was considered due to a slight rise of internal pressure of the basic cell due to a temperature rise. The increase of the capacitances of sample #1 or #2 is considered due to a partial oxidation of the polarized electrodes.

In summary, samples #1 exhibited results similar to the results of sample #2, and samples #1, #2, #4 and #5 exhibited the expected and desired results.

Sample #3 did not exhibit a problem in the appearance thereof after the aging condition; however, exhibited a short-circuit failure between the terminal plate and the aluminum foil resulting from a punch-through of the fused layer 11c. This was considered due to the smaller thickness of the fused layer 11c, which should be equal to or larger than 100 $\mu$m in consideration of the results of samples #1 to #3.

The blister of the comparative example after the 1000 hours of aging condition was examined. The comparative example was immersed in water and the portion of the blister was thrust, resulting in generation of air bubble appearing through the laminated overcoat in the vicinity of the external terminal 18a. Thus, the blister is considered due to the lack of the sealing function of the laminated overcoat 11 in the vicinity of the external terminal 18a, wherein the air entering through the laminated overcoat reduced the thrust force exerted by the atmospheric pressure.

The blister of the comparative example is associated with a significant increase of the ESR, which resulted in that the measurement of the capacitance was not possible. On the other hand, the slight increase of internal pressure in samples #1 and #2 did not substantially affected the electric characteristics thereof.

As described above, the embodiments of the present invention effectively prevented degradation of the electric characteristics of the EDLC.

Since the above embodiments are described only for examples, the present invention is not limited to the above embodiments and various modifications or alterations can be easily made therefrom by those skilled in the art without departing from the scope of the present invention.

What is claimed is:

1. An electric double-layer capacitor (EDLC) comprising:
    a stacked body including at least one basic cell having
        a separator,
        a pair of polarized electrodes sandwiching therebetween said separator,
        a pair of current collectors sandwiching therebetween said pair of polarized electrodes,
        said separator and said polarized electrodes being impregnated with an electrolytic solution;
    a pair of terminal plates sandwiching therebetween said stacked body, said terminal plates being electrically connected to said current collectors disposed on outermost sides of said stacked body;
    a pair of external terminals extending from said terminal plates; and
    a laminated overcoat encapsulating said stacked body and said terminal plates, said laminated overcoat having an innermost film adhered to substantially entire exposed surfaces of said terminal plates and of said stacked body.

2. The EDLC as defined in claim 1, wherein said innermost film is substantially fused.

3. The EDLC as defined in claim 1, wherein said innermost film is made of at least one material selected from the group consisting of polyethylene resin, ethylene copolymer resin and polypropylene.

4. The EDLC as defined in claim 1, wherein said laminated overcoat encapsulates said terminal plates and said stacked body on a substrate.

5. The EDLC as defined in claim 4, wherein said substrate is a rigid plate or a flexible plate.

6. The EDLC as defined in claim 4, wherein said substrate has a plurality of holes for mounting said EDLC.

7. The EDLC as defined in claim 4, wherein said substrate has electric terminals or electric wires electrically connected to said terminal plates.

8. The EDLC as defined in claim 1, wherein said at least one basic cell includes a plurality of basic cells, and one of said current collectors sandwiched between said polarized electrodes of adjacent two of said basic cells is shared by said adjacent two of said basic cells.

9. The EDLC as defined in claim 1, wherein said laminated overcoat is in contact with said pair of terminal plates and said stacked body substantially without forming therebetween a gap.

10. The EDLC as defined in claim 1, wherein said laminated overcoat is in contact with said pair of terminal plates and said stacked body such that there is no gap having an inner volume above 0.125 mm³.

11. The EDLC as defined in claim 1, wherein said laminated overcoat comprises said inner most film, an intermediate foil and an outermost resin layer.

12. The EDLC as defined in claim 11, wherein said foil is made from aluminum or aluminum alloy.

13. A method for fabricating the EDLC claimed in claim 1, said method comprising the steps of:

adhering said innermost film to said exposed surfaces by an equal-pressure pressing technique using a fluid at a temperature higher than a softening temperature of said innermost film.

14. The method as defined in claim 13, wherein said innermost film is made of at least one material selected from the group consisting of polyethylene resin, ethylene copolymer resin and polypropylene, and has a thickness of 100 µm or more.

15. The method as defined in claim 13, further comprising the step of shaping said laminated overcoat, said stacked body and said terminal plates into a bulk-like body, before said equal-pressure pressing.

16. The method as defined in claim 13, wherein the equal-pressure pressing is conducted while an internal of a bag accomodating said laminated overcoat, said terminal plates and said stacked body is evacuated.

\* \* \* \* \*